Sept. 13, 1949.  V. N. TRAMONTINI  2,481,630
HEATER CONTROL
Filed Dec. 8, 1945  2 Sheets-Sheet 1
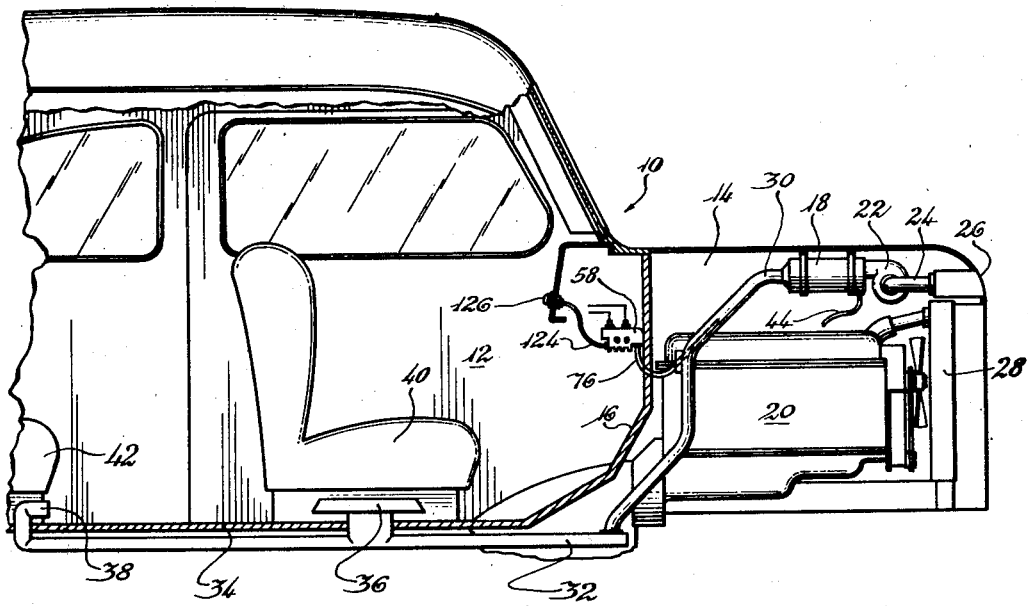
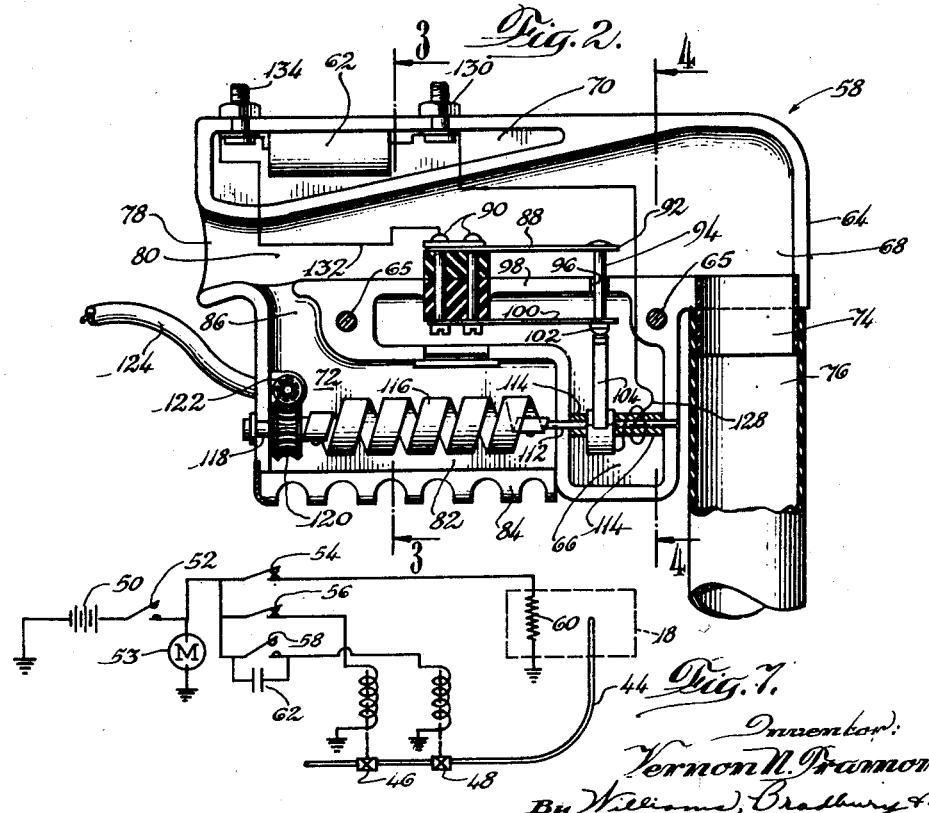
Inventor:
Vernon N. Tramontini
By Williams, Bradbury & Hinkle
Attorneys.

Sept. 13, 1949.   V. N. TRAMONTINI   2,481,630
HEATER CONTROL
Filed Dec. 8, 1945   2 Sheets-Sheet 2
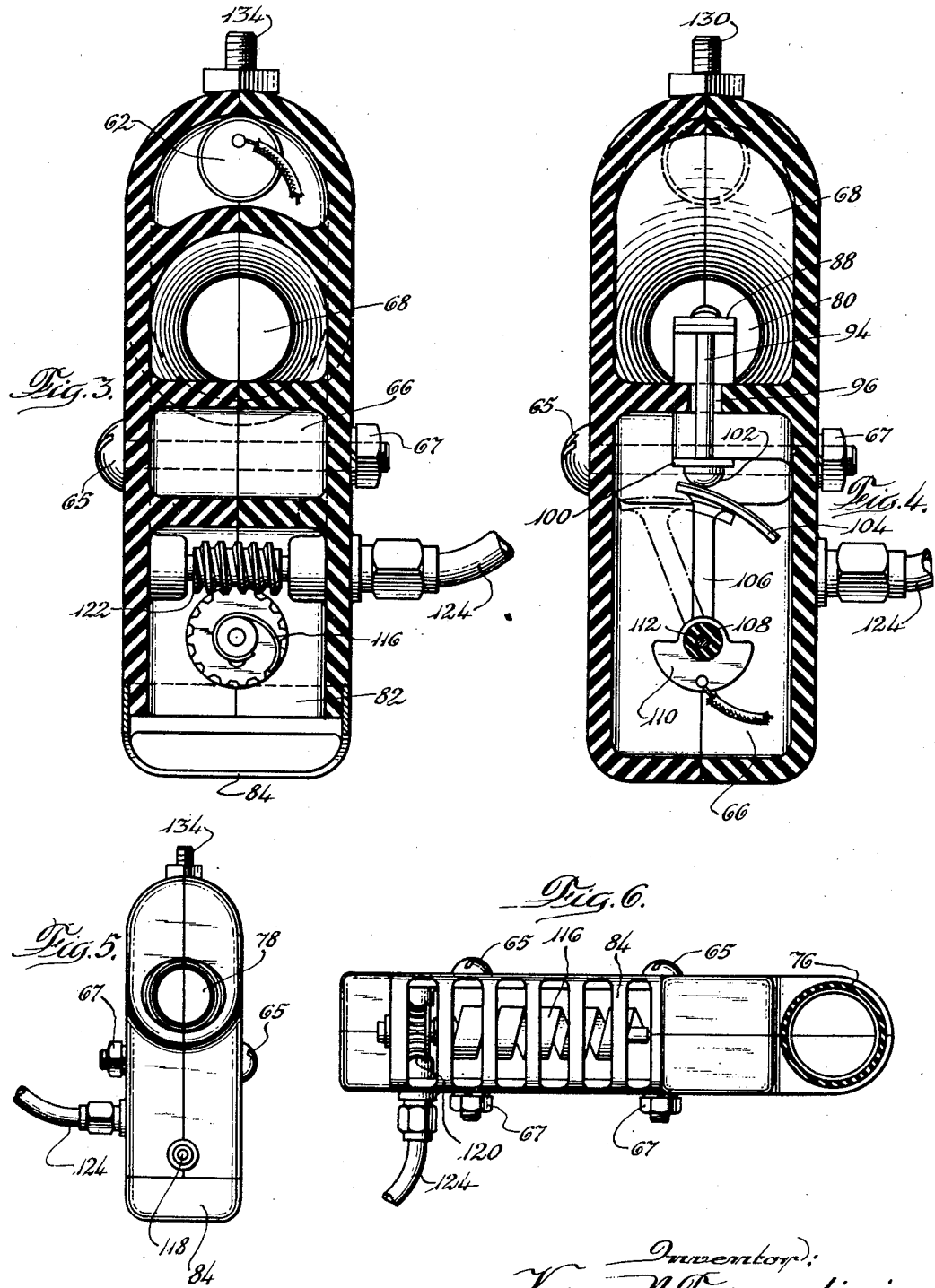

Patented Sept. 13, 1949

2,481,630

UNITED STATES PATENT OFFICE 2,481,630

HEATER CONTROL

Vernon N. Tramontini, Indianapolis, Ind., assignor to Stewart-Warner Corporation, Chicago, Ill., a corporation of Virginia Application December 8, 1945, Serial No. 633,733

3 Claims. (Cl. 236—9)

The present invention relates to heater controls and is, more particularly, concerned with a control system and control device for regulating the heat output of a small combustion heater in accordance with demand conditions.

Recently there have been developed combustion type heaters for use in automotive vehicles and for like heating purposes in which a wide range of heat outputs is possible simply by controlling the rate of fuel supply to the heater. One example of such a heater is illustrated and described in the copending application of George Wallen and Vernon N. Tramontini, filed June 14, 1946, which has been given Serial No. 676,776. A typical heater of this type, for example, may have a high heat output of approximately 20,000 to 25,000 B. t. u. per hour and a low heat output under reduced fuel supply conditions of something on the order of 4,000 B. t. u. per hour. Under normal conditions, 4,000 B. t. u. per hour is not sufficient to keep the occupants of an automobile warm excepting in extremely mild weather. On the other hand, 20,000 B. t. u. per hour is far too much for continuous operation, but such high output is an advantage in that it permits the automobile to be quickly heated to a comfortable temperature even in severe weather.

The principal object of the present invention is to provide an improved control system and controller for such a heater which will modulate the heat output according to the requirements of the occupants in such manner that the temperature of the ventilating air entering the occupied space of the vehicle will be high when the occupied space is quite cold and will taper off as the temperature rises within the occupied space and then will maintain a comparatively constant temperature level thereafter without sharp on-off cycles.

An additional object of the present invention is to provide a novel heater control system and controller which avoids abrupt fluctuations in the temperature of the air within the occupied space.

Yet another object of the present invention is to provide a novel control system and controller which regulates the heater output so as to obtain a desired temperature for the ventilating air under all conditions and which avoids abrupt fluctuations of the ventilating air temperature.

Still another object of the present invention is to provide a controller and control system for accomplishing the above at comparatively low cost.

Other objects and advantages will become apparent from the following description of a preferred embodiment of my invention which is illustrated in the accompanying drawings.

In the drawings in which similar characters of reference refer to similar parts throughout the several views:

Fig. 1 is a diagrammatic illustration of an automobile partly in longitudinal section showing the layout of a typical heating system and one arrangement of the controller and control system comprising the present invention associated therewith;

Fig. 2 is a longitudinal vertical sectional view through a controller which incorporates the present invention. Fig. 2 has been taken with one half of the controller case removed and therefore only a portion of the structure is illustrated in section;

Fig. 3 is a transverse vertical sectional view which may be considered as taken in the direction of the arrows along the line 3—3 of Fig. 2;

Fig. 4 is a similar sectional view which may be considered as taken in the direction of the arrows along the line 4—4 of Fig. 2;

Fig. 5 is an end view of the device;

Fig. 6 is a bottom view; and

Fig. 7 is a diagrammatic representation of an electrical circuit suitable for use with the device of the present invention.

The automobile 10 is provided with a driver's compartment 12 separated from the engine compartment 14 by a dash 16. Within the engine compartment, the heater 18 is located in a position above the engine 20 and is provided with a blower 22 on its inlet side. The inlet of the blower is connected by means of a duct 24 to a ram or air inlet opening 26 located behind the radiator grill in a position above the radiator 28.

The air outlet end of the heater is connected to a ventilating air duct 30 which extends rearwardly and downwardly to a longitudinally extending duct 32 arranged beneath the floor 34 of the vehicle. This duct is provided with outlets 36 and 38 located respectively beneath the driver's seat 40 and the rear seat 42. A fuel line 44 is connected to the heater in such manner that the fuel under pressure passes through an on-and-off solenoid valve 46 and thence through a restricting solenoid valve 48 before arriving at the heater. These valves are so constructed that when the valve 46 is de-energized, it is in closed position and no fuel is permitted to flow therethrough, while when this valve is energized, fuel in adequate quantity to operate the heater at the high heat output level is permitted to flow.

Valve 48 is so constructed that when deenergized and therefore closed it leaks a sufficient quantity of fuel to operate the heater at the low heat output level. When this valve is energized, it opens and offers substantially no restriction to the flow of fuel therethrough. It is apparent, therefore, that so long as the valve 46 is de-energized, the heater will not operate. When both valves are energized, the heater will operate at its high output and when valve 46 is energized and valve 48 de-energized, the heater will operate at the low heat output rate.

Referring to Fig. 7, it will be seen that the automobile battery 50 supplies electric power through the heater on-and-off switch 52 to three thermostatic switches, 54, 56 and 58, and the motor 53 for the blower 22. Of these switches, switch 54 is connected to the hot wire igniter 60 of the heater 18, the other end of the igniter being grounded. Thermostatic switch 56 is connected to one terminal of the on-and-off solenoid valve 46, the other terminal of this valve being grounded, while the thermostatic switch 58 is similarly connected to the restricting solenoid valve 48. In order to prevent sparking at the contacts of the thermostatic switch 58, this switch is provided with a capacitor 62.

The switches 54 and 56 are arranged closely adjacent the heater at the hot air outlet end so that these switches will be sensitive to the temperature of the air leaving the heater.

When switch 52 is closed, if the heater has not been operating recently, the switches 54 and 56 will be closed, and thus the igniter 60 is energized and quickly comes up to ignition temperature. Also the solenoid valve 46 will be opened, thereby permitting fuel to flow to the heater. Soon after combustion is well established, the temperature of the outlet air from the heater will rise sufficiently to open the switch 54 and de-energize the igniter 60. The purpose of the switch 56 is to serve as an overheat safety control so as to shut off the fuel supply completely if the temperature of the air leaving the heater becomes excessively hot as might occur if the blower 22 fails to operate. The switch 58 operates as will be described presently to cycle the heater between the high heat output position and the low heat output position as required to maintain a comfortable temperature within the automobile. The present invention is concerned primarily with the construction and operation of the switch 58.

The switch 58 is comprised of a case 64 which in the present embodiment is shown as being formed in halves which are molded from a suitable plastic material, such as "Bakelite," for instance. As shown, the molded case includes a lower closed compartment 66, an L-shaped air passage 68 through the device, an upper closed small compartment 70 and a second air passage 72 which intersects the passage 68. In general, the case is shaped to provide an inlet fitting 74 which is connected to a tube 76 preferably of low thermal conductivity material which extends from the driver's compartment 12 through the dashboard 16 and into the duct 30. Preferably the tube 76 should extend within the duct 30 in a direction toward the heater and into a position comparatively close to the heater for reasons which will appear presently. Also, to prevent heat loss and to obtain better control, the duct 30 preferably should be formed of a material of low thermal conductivity or else should be insulated with asbestos or glass wool.

Air passing inwardly through the tube 76 enters the fitting 74 and from there flows into the passage 68 which near its outlet end 78 is provided with a Venturi throat 80 to increase the velocity of the air just before it leaves the controller. The flow of air through the passage 68 is produced both by the pressure built up in the duct 30 by the blower 22 and by the dynamic effect of the air flowing through the duct 30 and impinging against the mouth of the tube 38. It is apparent, therefore, that if the outlets beneath the seats are closed or partially closed, the flow rate through the duct 30 will be reduced, but the static pressure will rise, with the result that the flow rate through the tube 76 will remain approximately the same. Conversely, if the outlets are wide open and the pressure drop through the duct system is therefore low, the static pressure within the duct 30 will be low, but since the velocity will be high, the dynamic pressure at the inlet of the tube 76 will be high, thereby insuring sufficient flow through the controller 58.

I prefer that the tube 76 be of low heat loss material and have its inlet end comparatively close to the heater, since otherwise closing the outlet openings beneath the seats would reduce the flow rate through the duct 30 to such a low point that heat loss from the large duct 30 might cool the duct air appreciably before it reached the tube 76. Therefore, if the tube 76 does not extend well into the duct 30, the temperature of the air picked up by the tube 76 and delivered to the controller 58 may be considerably cooler than the temperature of the air leaving the heater.

The branch passage 72 is comprised of a generally rectangular chamber 82 open at the bottom of the device, this opening being covered by a grill 84 and by an outlet connection 86 which leads from the chamber 84 to the throat of the venturi 80. Air flowing through the tube 76 and passage 68, therefore, produces a low pressure area at the Venturi throat 80 which serves to aspirate air from the outlet connection 86 with the result that air is drawn in through the grill 84, passes through the chamber 82, and joins the air stream passing through the venturi 80, the mixture leaving the device at the opening 78.

Inasmuch as the controller is mounted within the driver's compartment as shown in Fig. 1, the air drawn through the chamber 82 will be at the temperature prevailing within the driver's compartment, while the air passing through the passage 68 will be at approximately the temperature prevailing at the heater outlet.

A thermostatic bimetal strip 88 is secured at one end by means of screws 90 passing through the partition 98 which separates the passage 68 from the compartment 66, so that it is located within the passage 68 and is therefore subject to the temperature of the air flowing therethrough. The free end 92 of the strip 88 is connected to a pin 94 which extends downwardly through an opening 96 in the partition 98. At its lower end, the pin 94 is similarly connected to a light spring strip 100 at its free end, the opposite end of the strip 100 being secured by the same screws 90 which attach the bimetal strip 88. The purpose of strip 100 is to keep the pin 94 in alignment as the bimetal strip 88 moves up and down. The extreme lower end of the pin 94 is provided with a contact button 102 which is positioned just below the free end of the strip 100. This contact button rests against the upper surface of an arcuate cam 104, the profile of which is shown in Fig. 4. This cam is connected by means of a spoke 106 with a hub 108 of insulating material, such as hard fiber, for instance, and a counterbalance 110 arranged on the opposite side of the hub. The hub 108 is secured to a shaft 112 which is journaled to rotate in bearings located at opposite ends of the chamber 66, the cam 104 being restrained against longitudinal movement by tubular insulating spacers 114 which surround the shaft 112.

One end of the shaft 112 extends through and into the chamber 82 and is secured to one end of a coiled bimetal strip 116 which extends longitudinally of the device, the other end of the bimetal being secured to a stub shaft 118 journaled for rotation in the wall at the front end of the device and provided with a gear 120 located just inside the compartment 82. The gear 120 is meshed with a worm 122 driven by a flexible shaft 124 of the speedometer drive type, the opposite end of the flexible shaft 124 being connected to a control knob 126 located upon the automobile dash within convenient reach of an operator.

Preferably the contact point 102 is made of silver or other good electrical contact material, and at least the rim surface of the cam 104 is silver plated. The cam 104 is connected by means of a flexible pigtail lead 128 with a terminal 130 located at the top of the device. Similarly, one of the screws 90 in contact with the bimetal strip 88 and the spring strip 100 and hence in contact with the button 102, is connected by a lead 132 with a second terminal binding post 134 also located at the top of the device. The capacitor 62 previously referred to is located within the compartment 70 and is connected across the terminal 130 and 134 so as to be across the contacts 102 and 104.

The device operates in the following manner. If it is assumed that the automobile has remained out of doors in cold weather until the temperature within the compartment is well below the comfort level, the thermostatic switch 88 will be cooled and will tend to urge the contact point 102 downwardly. Also the coiled bimetal element 116 will be chilled, thereby causing it to rotate the cam 104 to the position shown in full line in Fig. 4. In other words, it rotates this cam such that the higher portion of the cam surface is against the contact button 102. When the heater is started under these conditions in the manner previously described, the restricting solenoid valve 46 will be energized, thereby permitting a full flow of fuel to the heater so as to give the high heat output for which the heater is designed, as for example, 20,000 B. t. u. per hour. The temperature of the air passing through the duct 30, therefore will soon become quite high with the result that the temperature of the air passing through the tube 76 and through the passage 68 in the controller will also be high.

This hot air heats the bimetal element 88 to approximately the ambient temperature in the passage 68, and this causes the free end 92 to tend to move upwardly. However, inasmuch as the strip 88 is already bent upwardly because of the high position of the cam 104, the contacts 102 and 104 will not separate. In other words, heating the bimetal element 88 under these conditions merely tends to relieve the spring action of the bimetal element to some extent.

The hot air passing through the passage 68 draws air inwardly through the grill 82 in the manner previously described, so that the bimetal element 116 remains cold even though the bimetal element 88 may be quite hot. The bimetal element 116 therefore keeps the cam in the position shown in full line in Figs. 4, so long as the temperature of the air within the automobile compartment is below a comfortable level. The heater therefore continues to operate at its high output rate until the automobile body temperature comes up to a point slightly below the comfort level. At this point, air aspirated through the grill 84 has raised the temperature of the bimetal element 116 sufficiently to cause it to unwind somewhat so as to move the cam 104 toward the position shown in broken lines in Fig. 4. This separates the contact 102 from the arcuate surface of the cam 104 and permits the solenoid valve 46 to close so as to reduce the rate of fuel supply to the heater and to shift the heater to its low heat output position. This is done just before the temperature in the compartment reaches a comfortable level, in order to prevent the temperature from overshooting. As the temperature within the duct 30 decreases, the temperature of the air within the passage 68 similarly decreases, thereby cooling the thermostatic strip 88 and permitting it to move downwardly somewhat. The result is that after a short interval of low heat operation, the contact point 102 is again brought against the contact strip of the cam 104 so as to energize the restricting solenoid valve 46, thereby causing an increase in the temperature of air passing through the duct 30 and passage 68 which again heats the bimetal strip 88 and separates the contacts 102 and 104.

If the temperature within the occupied compartment continues to rise, the cam 104 will be rotated more and more toward the dotted line position shown in Fig. 4, which in turn reduces the ratio of high heat output time to low heat output time. It is apparent, therefore, that the mean average temperature of the air flowing into the automobile compartment is higher when the temperature within the compartment is low, that is, with the cam more toward the position shown in full line in Fig. 4, than when the temperature therein is comparatively high, that is, more toward the position shown in broken lines in Fig. 4.

If the temperature within the driver's compartment after it reaches equilibrium, is higher or lower than the occupants desire it, this can be corrected by rotation of the knob 126 which shifts the starting position of the bimetal coil 116.

In order to maintain the temperature within the automobile body substantially constant without too great periodic fluctuations, it is desirable that the temperature of the bimetal coil 116 have more effect upon the restricting solenoid valve circuit than the temperature of the air in the duct 30. I have found a good compromise to be one such that approximately one degree of temperature variation of the element 116 will have approximately the same effect upon the contacts 102 and 104 as ten degrees of temperature variation of the bimetal strip 88. In other words, ten degrees of variation in the temperature of bimetal strip 88 should produce approximately the same amount of motion of the contact 102 vertically as one degree change in temperature of the coil 116 will produce in the vertical component of movement produced by rotational movement of the cam 104.

From the above description of a preferred embodiment of my invention, it is apparent that the heat output, or, in other words, the mean average temperature of the air in the duct 30, will decrease as the temperature within the car body rises toward a comfortable level so as to prevent overshooting, and that similarly the temperature of the air will decrease gradually if for some reason the compartment has been heated to too high a temperature and it is desired to reduce this temperature.

Having described my invention, what I claim as new and useful, and desire to secure by Letters Patent of the United States, is:

1. A device of the type described for controlling the heat output of a heater, said heater having a hot air outlet duct comprising means forming an air passage, said passage being adapted to be connected on its inlet side with said hot air duct, another portion of said passage being formed to provide a Venturi throat, first thermostatic means in said passage responsive to the temperature of the air flowing therethrough, means forming a second air passage, said second air passage having an inlet opening adapted to receive air from the space to be heated and an outlet opening at said Venturi throat, second thermostatic means in said second passage responsive to the temperature of the air flowing therethrough, a first contact and a second contact co-operating therewith, said first contact being connected to be moved away from said second contact by said first thermostatic means upon an increase in the temperature of said first thermostatic means and said second contact being connected to be moved away from said first contact by said second thermostatic means upon an increase in the temperature of said second thermostatic means.

2. A heater system for an automotive vehicle or the like comprising means forming a combustion chamber, a heat exchanger to receive hot products of combustion therefrom and through which ventilating air is adapted to be passed in heat exchange relation thereto, means for supplying fuel to said combustion chamber, said supplying means including a magnetic valve which in one position permits sufficient fuel to flow to operate the heater at a high output level and in another position restricts the flow of fuel to the burner so as to operate the heater at a lower output level, a bimetallic blade responsive to the temperature of the ventilating air leaving the heater, a pair of switch contacts, one of said contacts being operated by said bimetallic blade, circuit means including said contacts and said valve for cycling said fuel supply system from the high to the low position and back to the high position rapidly accordingly as the temperature of the ventilating air leaving the heater increases and then decreases, a second bimetallic element responsive to the temperature of the space to be heated, said second bimetallic element being connected for moving the second of said switch contacts toward and away from the first contact as the temperature within the space to be heated falls or rises above a predetermined level so as to determine the duct temperature at which said switch is opened or closed by the first said bimetallic element.

3. A heater system for an automotive vehicle or the like comprising means forming a combustion chamber, a heat exchanger to receive hot products of combustion therefrom and through which ventilating air is adapted to be passed in heat exchange relation thereto, means for supplying fuel to said combustion chamber, said supplying means including an electrically operated flow controller which in one position permits sufficient fuel to flow to operate the heater at a high output level and in another position restricts the flow of fuel to the burner so as to operate the heater at a lower output level, a thermostatic element responsive to the temperature of the ventilating air leaving the heater, a pair of switch contacts, one of said contacts being operated by said thermostatic element, circuit means including said contacts and said electrically operated flow controller for cycling said fuel supply system from the high to the low position and back to the high position rapidly accordingly as the temperature of the ventilating air leaving the heater increases and then decreases, a second thermostatic element responsive to the temperature of the space to be heated, said second thermostatic element being connected for moving the second of said switch contacts toward and away from the first contact as the temperature within the space to be heated falls or rises above a predetermined level so as to determine the duct temperature at which said switch is opened or closed by the first said thermostatic element.

VERNON N. TRAMONTINI.

REFERENCES CITED

The following references are of record in the file of this patent:

UNITED STATES PATENTS

| Number | Name | Date |
| --- | --- | --- |
| 922,783 | Korting | May 25, 1909 |
| 2,164,882 | Miles | July 4, 1939 |
| 2,259,061 | Caffler | Oct. 14, 1941 |
| 2,262,496 | Hobbs | Nov. 11, 1941 |

FOREIGN PATENTS

| Number | Country | Date |
| --- | --- | --- |
| 318,699 | Great Britain | Sept. 12, 1929 |